(12) United States Patent
Register (10) Patent No.: US 10,328,611 B2
(45) Date of Patent: Jun. 25, 2019

(54) MECHANICAL SUPPORT TOOLING AND/OR MANDREL FOR COMPOSITE PART CURING

(71) Applicant: The Boeing Company, Chicago, IL (US)

(72) Inventor: Justin Register, Charleston, SC (US)

(73) Assignee: The Boeing Company, Chicago, IL (US)

( * ) Notice: Subject to any disclaimer, the term of this patent is extended or adjusted under 35 U.S.C. 154(b) by 709 days.

(21) Appl. No.: 14/879,122

(22) Filed: Oct. 9, 2015

(65) Prior Publication Data
US 2017/0100859 A1  Apr. 13, 2017

(51) Int. Cl.
| B29C 33/48 | (2006.01) |
| B30B 3/04 | (2006.01) |
| B29C 43/02 | (2006.01) |
| B29D 22/00 | (2006.01) |
| B29C 70/44 | (2006.01) |
| B30B 15/02 | (2006.01) |

(52) U.S. Cl.
CPC ........... *B29C 33/485* (2013.01); *B29C 43/02* (2013.01); *B29C 70/446* (2013.01); *B29D 22/00* (2013.01); *B30B 3/045* (2013.01); *B30B 15/026* (2013.01)

(58) Field of Classification Search
CPC ........ B30B 3/045; B29C 3/485; B29C 33/485
See application file for complete search history.

(56) References Cited

U.S. PATENT DOCUMENTS

| 3,425,642 | A | | 2/1969 | May | |
| 3,784,338 | A | * | 1/1974 | Previati | B29C 33/485 425/34.2 |
| 3,825,392 | A | * | 7/1974 | Ligon | B26D 3/16 249/184 |
| 4,044,092 | A | * | 8/1977 | Spears | B29C 33/485 264/296 |
| 4,209,161 | A | * | 6/1980 | Horvath | B22D 17/24 249/180 |
| 4,754,543 | A | * | 7/1988 | Spivy | B26D 3/16 279/2.1 |
| 4,842,508 | A | * | 6/1989 | Boskovic | B22D 17/24 249/142 |
| 4,908,090 | A | * | 3/1990 | Kozachevsky | B29C 33/485 156/140 |
| 5,230,904 | A | * | 7/1993 | Kaiser | B29C 33/485 249/152 |
| 5,700,415 | A | * | 12/1997 | Hiroki | B29C 33/485 249/152 |
| 7,357,166 | B2 | | 4/2008 | Pham et al. | |

(Continued)

*Primary Examiner* — Benjamin A Schiffman
(74) *Attorney, Agent, or Firm* — McDonnell Boehnen Hulbert & Berghoff LLP (57) ABSTRACT

Example mechanical supports or mandrels are described for composite part curing. In one example, a mandrel includes a housing, and components within the housing and positioned to create a central opening. An expander is also positioned in the central opening, and the expander has a width that increases along a length of the expander. A narrow end of the expander is positioned in the central opening. An actuator is provided to move the expander into the central opening causing the components to expand the housing, and to retract the expander from the central opening causing the components to collapse the housing.

17 Claims, 8 Drawing Sheets

(56) References Cited

U.S. PATENT DOCUMENTS

| | | |
|---|---|---|
| 8,293,051 B2 | 10/2012 | Morris et al. |
| 8,430,984 B2 | 4/2013 | Lee et al. |
| 8,800,953 B2 | 8/2014 | Morris et al. |
| 8,974,217 B2 | 3/2015 | Everhart et al. |
| 2003/0132563 A1* | 7/2003 | Palmer ............... B23B 31/4013 269/48.1 |
| 2011/0272536 A1* | 11/2011 | Valembois ............ B29C 33/485 248/200 |
| 2012/0073732 A1* | 3/2012 | Perlman ............... B29C 33/485 156/196 |
| 2012/0299215 A1* | 11/2012 | Piedmont ............. B29C 33/485 264/257 |
| 2013/0298365 A1* | 11/2013 | Sibona ................ F16H 25/2021 29/281.1 |
| 2013/0299095 A1* | 11/2013 | Sibona ................. B29C 53/824 156/535 |

* cited by examiner

MECHANICAL SUPPORT TOOLING AND/OR MANDREL FOR COMPOSITE PART CURING

FIELD

The present disclosure generally relates to methods and equipment for fabricating composite resin parts, and more particularly to a mandrel system used in curing composite parts.

BACKGROUND

Composite parts, such as those used in the manufacture of aircraft, can be constructed using various production methods, such as filament winding, tape placement, overbraid, chop fiber roving, coating, hand lay-up, or other composite processing techniques and curing processes. Most of these processes use a rigid cure tool/mandrel on which composite material is applied and then cured into a rigid composite part. For example, automated fiber placement (AFP) machines may be used to place fiber reinforcements on molds or mandrels to form composite layups. Following, composite parts may be cured within an autoclave that applies heat and pressure to the part during a cure cycle.

Some composite part geometries include internal cavities that may require a tool such as a supporting bladder that is placed in the cavity to ensure that the part geometry is properly maintained during application of composite material or when processed under autoclave pressure. The supporting bladder may be an inflatable bladder that can easily fit into an internal cavity prior to cure and then be inflated during an autoclave cure process so as to react to the autoclave pressure force applied to the part. Typically, such inflatable bladders are pressurized by venting them to the autoclave pressure through a vacuum bag.

However, the bladders that are used to support a composite part (e.g., a stringer or other longitudinal structural piece in a framework) for autoclave curing may not suitable when alternatively curing the part out-of-autoclave. In this case, the part and the bladder are exposed to different temperature and pressure conditions than in an autoclave such that an inflatable bladder may not perform properly and could in fact negatively impact final part characteristics. This creates a need for a support tool that can fit into a composite part cavity prior to cure, can conform to the internal geometry of the part cavity during out-of-autoclave curing, and finally can reduce in size to be removed from the part after cure.

SUMMARY

In one example, a mandrel is described that comprises a housing, a plurality of components within the housing and positioned to create a central opening, and at least one expander positioned in the central opening. The at least one expander has a width that increases along a length of the at least one expander, and a narrow end of the at least one expander is positioned in the central opening. The mandrel also comprises an actuator to move the at least one expander into the central opening causing the plurality of components to expand the housing and to retract the at least one expander from the central opening causing the plurality of components to collapse the housing.

In another example, a mandrel is described comprising a housing, an upper component, a lower component, a first side component, and a second side component each within the housing and positioned to create a central opening, and at least one expander having a width that increases along a length of the at least one expander. The at least one expander is positioned in the central opening, and a threaded member is positioned within the at least one expander. The threaded member is rotatable to move the at least one expander into the central opening causing the upper component, the lower component, the first side component, and the second side component to slide outward and expand the housing.

In still another example, a method is described that comprises providing a plurality of components within a housing and positioned to create a central opening and at least one expander positioned in the central opening, and the at least one expander has a width that increases along a length of the at least one expander, and a narrow end of the at least one expander is positioned in the central opening. The method also includes operating an actuator to move the at least one expander into the central opening causing the plurality of components to expand the housing, and operating the actuator to retract the at least one expander from the central opening causing the plurality of components to collapse the housing.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

DETAILED DESCRIPTION

Disclosed embodiments will now be described more fully hereinafter with reference to the accompanying drawings, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

Within examples, mechanical support tooling and/or mandrel for composite part curing. The mandrel may comprise a housing (or enclosure) and a plurality of components within the housing and positioned to create a central opening. An expander that has an increasing width along a length of the expander is also positioned in the central opening such that a narrow end of the expander is positioned in the central opening. An actuator is provided to move the expander into the central opening causing the plurality of components to expand the housing and to retract the expander from the central opening causing the plurality of components to collapse the housing.

The mandrel can be used to completely fill a cavity of the composite part that needs to be cured, and then can reduce in size (e.g., such as a reduction in cross-sectional dimension) to be pulled out and removed. Geometry of the components of the mandrel allows the mandrel to reduce in size to be inserted into a uncured composite part and then expanded to form a solid stiffener capable of withstanding out-of-autoclave cure pressure. The mandrel is further reusable since the mandrel can be reduced in size after cure to be removed from the part. Within examples, channels in the components maintain the components fitted together so that the components may be removed easily.

Figure 1:
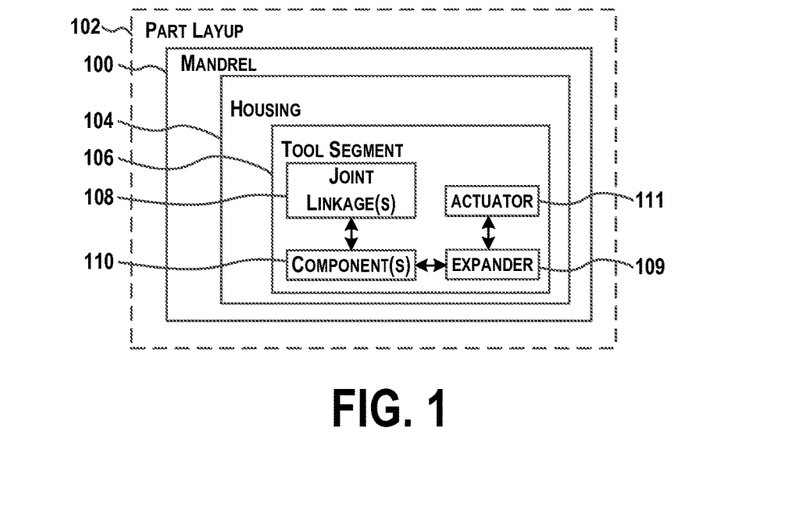
FIG. 1 illustrates an example system including a mandrel be used to form and/or cure a part layup, according to an example embodiment.

Referring now to FIG. 1, a mandrel 100 may be used to form and/or cure a part layup 102 comprising multiple plies (not shown) of fiber reinforced polymer resin. For example, multiple plies of fiber reinforced polymer plies are laid up over the mandrel 100 in order to form the plies into a desired part shape. The part layup 102 may partially or fully surround the mandrel 100, such that the mandrel 100 is at least substantially enclosed by the part layup 102. The mandrel 100 includes a housing 104 in which a tool segment 106 is positioned, and the housing 104 forms an enclosure that may collapse inwardly when the housing 104 is placed into a flexible state to allow the mandrel 100 to be withdrawn from the part layup 102 either after the layup is compacted and/or cured. The tool segment 106 may be expanded and collapsed to allow for removal. The tool segment 106 further includes a joint linkage(s) 108 that allow for connection to other tool segments. The tool segment 106 further includes a plurality of components 110 within the housing 104 and positioned to create a central opening. An expander 109 is positioned in the central opening and an actuator 111 is provided to move the expander 109 into the central opening causing the plurality of components 110 to expand the housing 104 and to retract the expander 109 from the central opening causing the plurality of components 110 to collapse the housing 104.

The mandrel 100 may be formed of any elastomeric material, such as Teflon® (E.I. du Pont de Nemours and Company) coated silicone or hard rubber, and may be pliable to enable the mandrel 100 to conform to various configurations. The housing 104 may be formed, for example and without limitation, from flexible silicon rubber, and thus, the housing 104 may be a flexible housing or an elastomer housing such that the housing may contact the uncured composite layup without damage to the layup and/or without contamination to the layup.

The components 110 may be support structures composed of any number of materials, including steal, plastic, etc. arranged within the housing 104 in a predetermined manner. The components 110 may be structures that are disposed within, but are separate from the housing 104. The components 110 may further generally include rigid materials that can withstand cure conditions, for example.

The part layup 102 may be cured to form any of a variety of composite components, structures, or parts that form full or partial enclosures having uniform or non-uniform cross sections along their lengths. For example, the cured part may comprise a duct (not shown) or a conduit (not shown) used to transport fluids, such as, for example and without limitation, air ducts and fuel lines used in a wide variety of applications, including vehicles. An example of a composite component that may benefit from use of the mandrel 100 and the tool segment 106 to form the part layup 102 is illustrated in FIG. 2.

Figure 2:
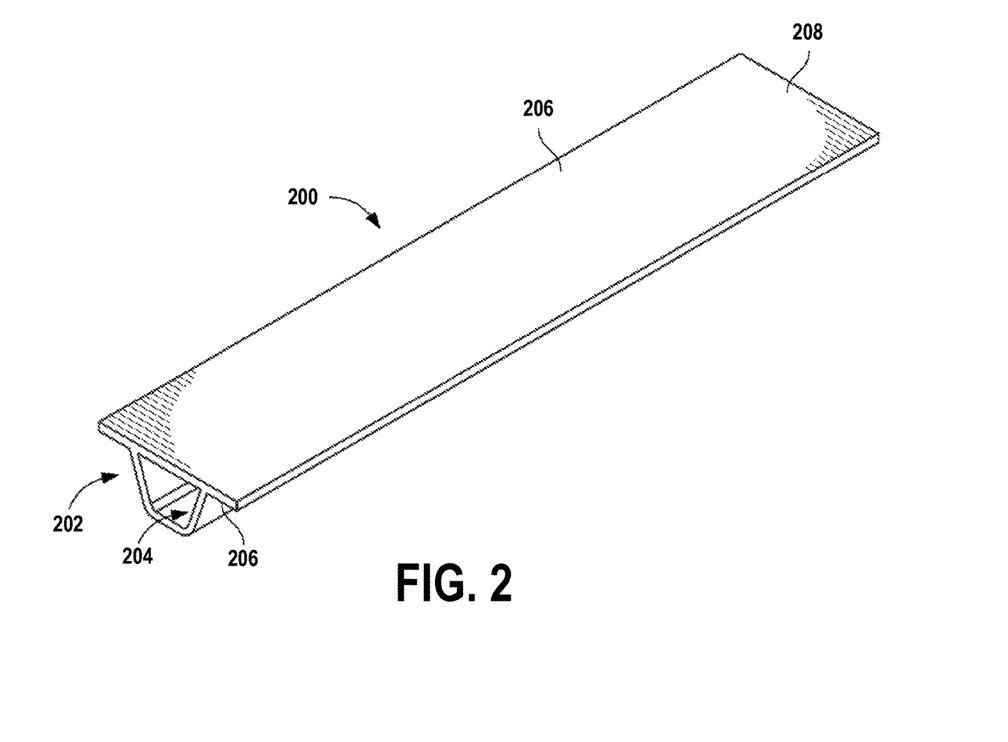
FIG. 2 illustrates an example of a composite component that may benefit from use of the mandrel as described in FIG. 1, according to an example embodiment.

In FIG. 2, the disclosed flexible apparatus and curing method may be employed to cure a variety of composite resin parts of various geometries, having one or more internal cavities. For example, and without limitation, the disclosed flexible bladder and curing method may be used in fabrication of a fiber reinforced composite resin stringer 200. In one arrangement, the stringer 200 may comprise a multi-ply layup of prepreg. In the illustrated arrangement, the stringer 200 comprises a hat section 202 forming an internal stringer cavity 204, a pair of laterally extending flange sections 206, and a substantially flat skin section 208 that is consolidated together with the flange sections 206 during curing. As those of ordinary skill in the art will recognize, alternative stringer geometries are possible.

The stringer 200 may be fabricated using the mandrel 100 and the tool segment 106 in FIG. 1 by applying the part layup 102 to the mandrel 100 with the tool segment 106 inserted into the mandrel 100. After curing, the part layup 102 forms the stringer 200. The tool segment 106 fills the stringer cavity 204 that is a hollow trapezoidal space or opening. The tool segment 106 functions to so as to maintain a shape and contour of the stringer 200 during cure and is collapsible to be reduced in size and is removable after cure.

In other embodiments, the stringer 200 is preformed and is uncured. The mandrel 100 may have a cross-section that can reduce in size so that the mandrel 100 can be positioned within the stringer cavity 204 and has a shape that substantially conforms to the corresponding stringer cavity 204 when the mandrel 100 is expanded such that the mandrel 100 and housing 104 may provide support to the stringer 200 during curing. The mandrel 100 of the illustrated embodiment has a trapezoidal shape to conform to a hat-shaped stringer 200, although the mandrel could have any number of other shapes to conform to differently shaped stringers.

As used herein, by the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide. Similarly, the term "about" includes aspects of the recited characteristic, parameter, or value allowing for deviations or variations, including for example, tolerances, measurement error, measurement accuracy limitations and other factors known to skill in the art, and also ranges of the parameters extending a reasonable amount to provide for such variations.

Example composite material used for the stringer 200 may be generally a lightweight material, such as an uncured pre-impregnated reinforcing tape or fabric (i.e., "prepreg"). The tape or fabric can include a plurality of fibers such as graphite fibers that are embedded within a matrix material, such as a polymer, e.g., an epoxy or phenolic. The tape or fabric could be unidirectional or woven depending on a degree of reinforcement desired. Thus, the prepreg tape or fabric is laid onto the mandrel 100 (or mold) to pre-form the tape or fabric into a desired shape of the stringer 200 as defined by the mandrel 100. The stringer 200 could be any suitable dimension to provide various degrees of reinforcement, and could comprise any number of plies of prepreg tape or fabric.

Figure 3:
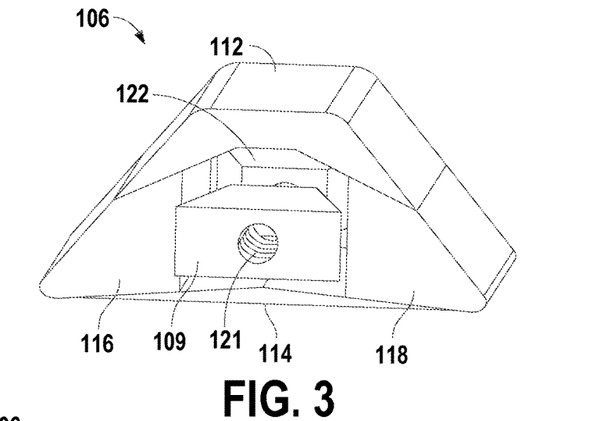
FIG. 3 illustrates an example end view of a tool segment, according to an example embodiment.
Figure 4:
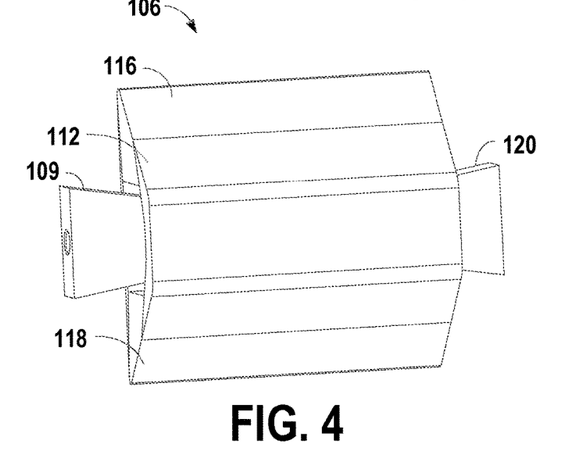
FIG. 4 illustrates an example top view of the tool segment, according to an example embodiment.

FIG. 3 illustrates an example end view of the tool segment 106, according to an example embodiment. FIG. 4 illustrates an example top view of the tool segment 106, according to an example embodiment. The tool segment 106 is shown to include the plurality of components including an upper component 112, a lower component 114, a first side component 116, and a second side component 118 positioned to create a central opening 122. The expander 109 is positioned in the central opening 122.

In FIG. 4, the tool segment 106 is shown to include two expanders 109 and 120. Each expander 109 and 120 may be identical in shape, and each expander 109 and 120 is inserted into the tool segment 106.

Figure 5:
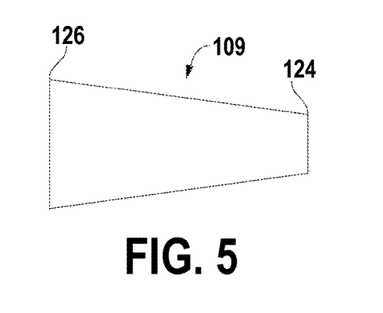
FIG. 5 illustrates an example top view of the expander, according to an example embodiment.

FIG. 5 illustrates an example top view of the expander 109, according to an example embodiment. The expander 109 has a width that increases along a length of the expander 109. For example, the expander has a narrow end 124 and a wide end 136. The narrow end 124 of the expander 109 is positioned in the central opening 122.

Figure 6:
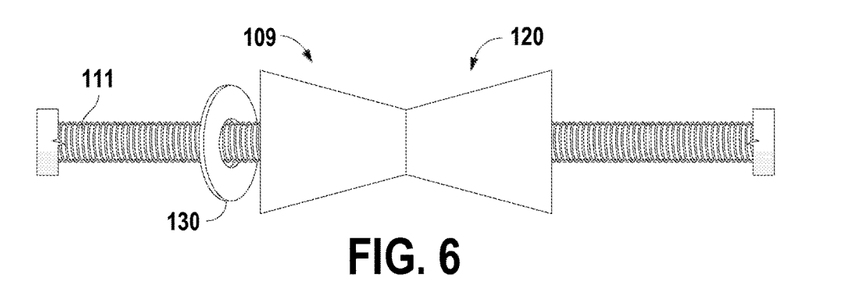
FIG. 6 illustrates an example top view of the actuator, according to an example embodiment.

FIG. 6 illustrates an example top view of the actuator 111, according to an example embodiment. The actuator 111 is shown as a threaded rod, and the threaded rod is positioned into a threaded hole 121 of the expander 109, and also into a threaded hole of the expander 120. A washer 130 may be included to provide separation as well. The actuator 111 may be actuated to move the expanders 109 and 120 into the central opening 122 causing the plurality of components to expand the housing 104 and to retract the expanders 109 and 122 from the central opening 122 causing the plurality of components to collapse the housing 104.

Within one example, the actuator 111 is a threaded member or rod positioned within the expanders 109 and 120, and the threaded member is rotatable to move the expanders into the central opening 122 causing the upper component 112, the lower component 114, the first side component 116, and the second side component 118 to slide outward and expand the housing 104. The intent is to urge the narrow end 124 into the components so that the wide end 126 provides for the expansion. The actuator 111 will pull the angled expanders 109 and 120 towards a center of the tool segment 106. The expanders 109 and 120 will push on walls of the upper component 112, the lower component 114, the first side component 116, and the second side component 118 causing them to separate. This motion will cause the upper component 112 to rise and the tool segment 106 to expand and form a solid stiffener, for example.

In FIGS. 3-6, the upper component 112, the lower component 114, the first side component 116, and the second side component 118 are shown to have specific shapes and/or configurations. For example, the upper component 112 has two side triangular portions connected by a center rectangular portion, while the first side component 116 and the second side component 118 have somewhat of triangular shape. The lower component 114 is also triangular in shape. Together, in an expanded state shown in FIG. 3, the tool segment 106 has a substantially trapezoidal shape. This trapezoidal shape works well to fill the stringer cavity 204 of the stringer 200, shown in FIG. 2, for curing.

In other examples, the components 110 may be configured in other shapes as needed to fill a specific cavity of a composite part. As an example, the components 110 may be rectangular or square instead of a triangular shape. In still other examples, the components 110 may form a rounded hat shape, or still other shapes are possible depending on application of the mandrel 100.

Figure 7:
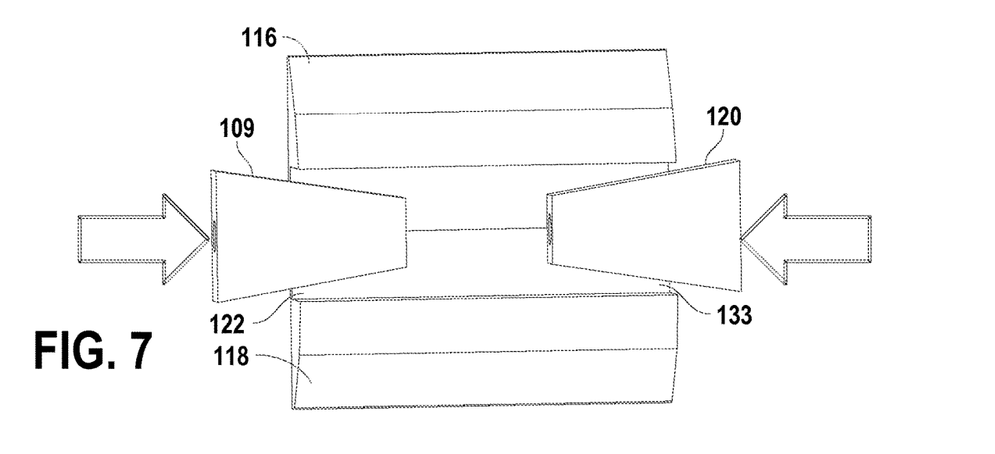
FIG. 7 illustrates a top view of the tool segment without the upper component, and example operation of the tool segment, according to an example embodiment.
Figure 8:
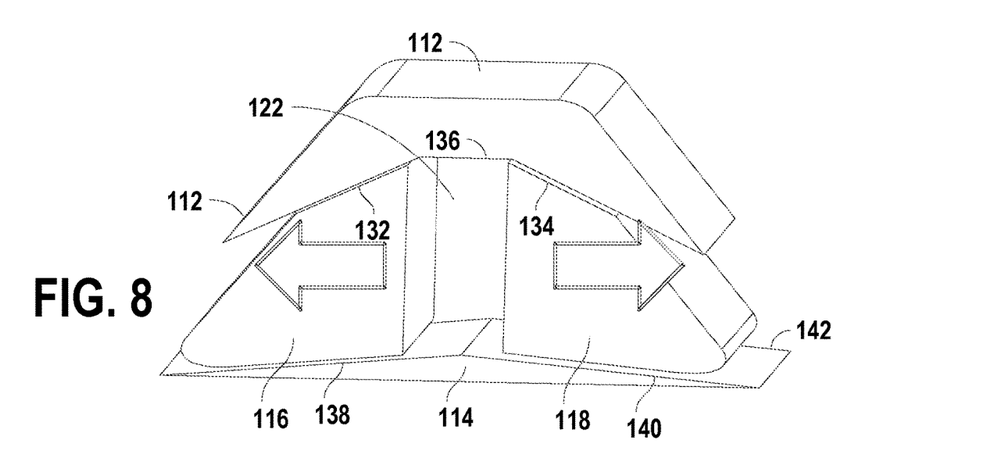
FIG. 8 illustrates an end view of the tool segment and example operation of the tool segment, according to an example embodiment.
Figure 9:
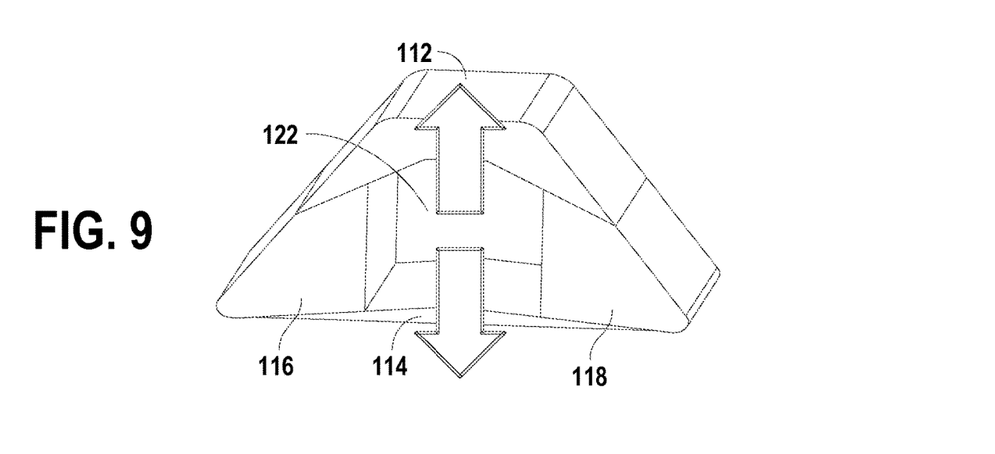
FIG. 9 illustrates the expanded state of the tool segment once all components have been moved into the expanded position, according to an example embodiment.

FIGS. 7-9 illustrate example operation of the tool segment 106, according to an example embodiment. In FIG. 7, a top view of the tool segment 106 without the upper component 112 is shown. The actuator 111 moves the narrow end of the expander 109 into the central opening 122 so that wider portions of the expander 109 contact the plurality of components and push the plurality of components outward to expand the housing. The actuator 111 moves the expander 109 into the central opening 122 causing the plurality of components to separate from each other, resulting in expansion of the housing. In examples where the actuator 111 is a threaded member, the threaded member is rotatable to move the expander 109 into the central opening 122 causing the plurality of components to slide outward and expand the housing.

As shown in FIG. 7, the upper component 112, the lower component 114, the first side component 116, and the second side component 118 are positioned within the housing in a first unexpanded state, and rotation of the threaded member causes the upper component 112, the lower component 114, the first side component 116, and the second side component 118 to be positioned in a second expanded state (shown in FIG. 9).

In FIG. 7, the tool segment 106 is shown with two expanders 109 and 120. The tool segment has a first end and a second end, and the central opening 122 is at the first end and a second central opening 133 is at the second end. The expander 109 is positioned into the central opening 122 and the expander 120 is positioned in the second central opening 133. The threaded member is rotatable to move the expander 109 into the central opening 122 and the expander 120 into the second central opening causing 133 expansion of the housing. In this example, the expander 109 is right hand threaded and the expander 120 is left hand threaded (or oppositely threaded) so that the threaded member is rotatable to move the expander 109 into the central opening 122 and the expander 120 into the second central opening 133 causing the expanders 109 and 120 to move toward each other.

FIG. 8 illustrates an end view of the tool segment 106. The first side component 116 and the second side component 118 have top surfaces 132 and 134 that abut a bottom surface 136 of the upper component 112, and bottom surfaces 138 and 140 that abut a top surface 142 of the lower component 114. Rotation of the threaded member causes the top surface 132 of the first side component 116 and the top surface 134 of the second side component 118 to push the bottom surface 136 of the upper component 112 upward as the first side component 116 and the second side component 118 slide outward causing the upper component 112, the first side component 116, and the second side component 118 to separate. Rotation of the threaded member also causes the bottom surface 138 of the first side component 116 and the bottom surface 140 of the second side component 118 to push a top surface 142 of the lower component 114 downward as the first side component 116 and the second side component 118 slide outward causing the lower component 114, the first side component 116, and the second side component 118 to separate. In this example, the top surface 132 of the first side component 116 and the top surface 134 of the second side component 118 are angled to match an angle of the bottom surface 136 of the upper component 112.

FIG. 9 illustrates the expanded state of the tool segment 106 once all components have been moved into the expanded position. In this example, the shape of the expanded state of the tool segment 106 matches the internal stringer cavity 204 of the stringer 200 shown in FIG. 2.

Thus, FIGS. 7-9 illustrate example operation of the tool segment 106 to move the components to an expanded state shown in FIG. 9. The tool segment 106 may be operated also to move the components back to the unexpanded state (shown in FIG. 7) by the actuator retracting the expanders 109 and 120 from the central openings 122 and 133 causing the components to reduce a size of the central openings 122 and 133, resulting in a reduction in size of the housing. In an example in which the actuator is a threaded member, the threaded member is rotatable to pull the expanders 109 and 120 into the central openings 122 and 133 toward a center of the tool segment and to retract the expanders 109 and 120 out of the central openings 122 and 133.

Operation of the tool segment 106 may be manual, such as by manual rotation of the actuator 111 for expansion and retraction of the tool segment 106. Because the actuator 111 may be a threaded rod, rotation causes the expander 109 to move along the rod. The tool segment 106 can be operated to expand to provide a stiff surface for an internal cavity of a composite part being cured, and then operated to retract to remove the tool segment 106 from the cavity. In other examples, operation of the tool segment 106 may be performed using a robotic apparatus controlled by a machine to cause rotation of the actuator 111.

Figure 10:
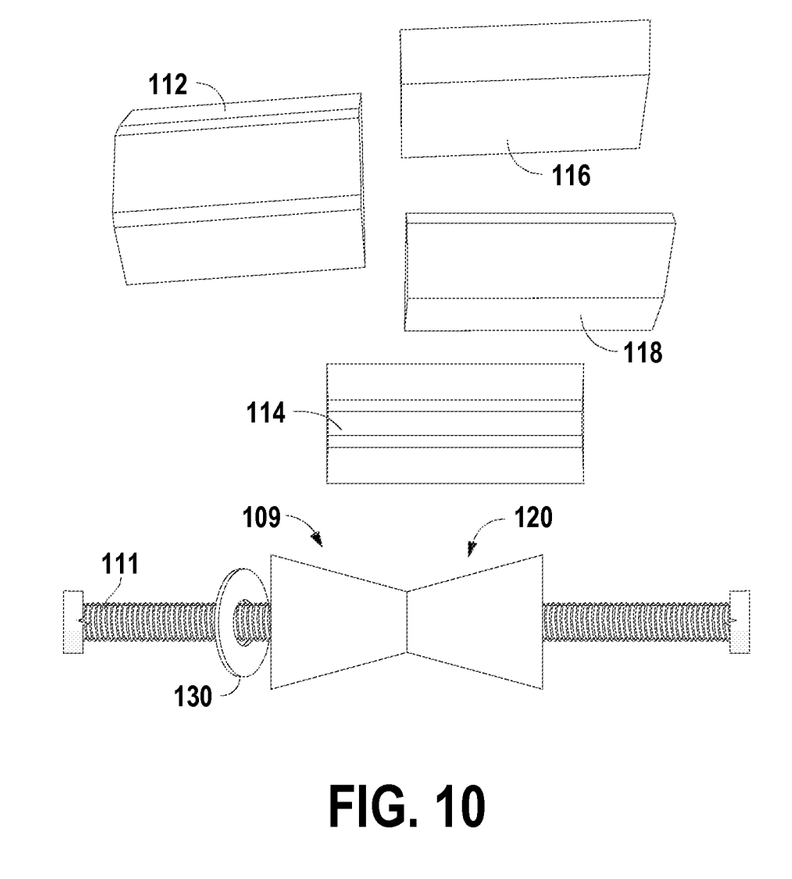
FIG. 10 illustrates separated components of the tool segment including the upper component, the lower component, the first side component, the second side component, the actuator, and the expanders, according to an example embodiment.

FIG. 10 illustrates separated components of the tool segment 106 including the upper component 112, the lower component 114, the first side component 116, the second side component 118, the actuator 111, and the expanders 109 and 120.

While the expander 109 is shown to be triangular in shape to provide for a change in dimensional width that pushes the upper component 112, the lower component 114, the first side component 116, the second side component 118 outward as the expander 109 is inserted into the central opening 122, the expander 109 may be other shapes as well. For example, the expander may be a rectangular or square shape of constant width, and internal walls of the upper component 112, the lower component 114, the first side component 116, the second side component 118 may be formed to have varying widths, such that as the expander 109 is inserted into the central opening 122, the upper component 112, the lower component 114, the first side component 116, the second side component 118 will be pushed outward.

Figure 11:
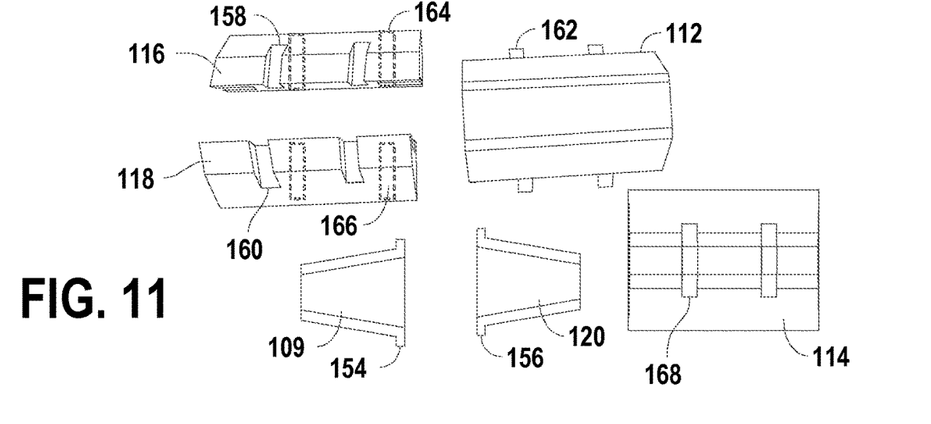
FIG. 11 illustrates separated components of the tool segment including the first side component and the second side component including external upper channels, and the upper component includes rails to slide into the external upper channels of the first side component and the second side component, according to an example embodiment.
Figure 12:
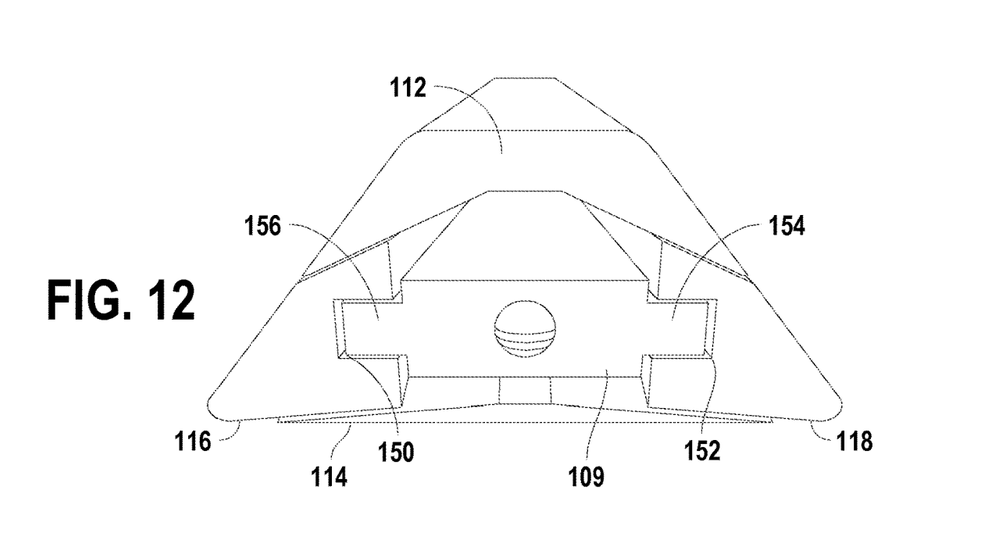
FIG. 12 illustrates an end view of the tool segment including the first side component and the second side component including internal side channels, and the expander includes side rails to slide into the internal side channels of the first side component and the second side component, according to an example embodiment.
Figure 13:
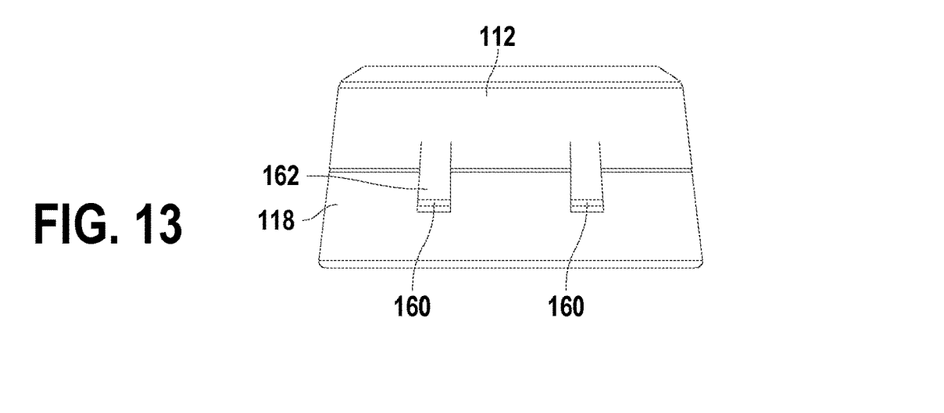
FIG. 13 illustrates a side view of the tool segment with the rails of the upper component inserted into the external upper channels of the second side component, according to an example embodiment.

In some examples, male and female grooves may be added to portions of the tool segment 106 to guide the components during expansion and contraction so as to maintain shape of the tool segment 106. FIGS. 11-13 illustrate the tool segment 106 with grooves or channels and rails on the components, according to an example embodiment.

FIG. 11 illustrates separated components of the tool segment 106 including the first side component 116 and the second side component 118 including external upper channels 158 and 160, and the upper component 112 includes rails 162 to slide into the external upper channels 158 and 160 of the first side component 116 and the second side component 118.

FIG. 11 also illustrates that the first side component 116 and the second side component 118 include external lower channels 164 and 166, and the lower component 114 includes rails 168 to slide into the external lower channels 164 and 166 of the first side component 116 and the second side component 118.

FIG. 12 illustrates components of the tool segment 106 including the first side component 116 and the second side component 118 including internal side channels 150 and 152, and the expander 109 includes side rails 154 and 156 to slide into the internal side channels 150 and 152 of the first side component 116 and the second side component 118.

FIG. 13 illustrates a side view of the tool segment 106 with the rails 162 of the upper component 112 inserted into the external upper channels 160 of the second side component 118.

The internal side channels 150 and 152, the external upper channels 158 and 160, and the external lower channels 164 and 166 of the first side component 116 and the second side component 118, as well as the side rails 154 and 156 of the expander 109, the rails 162 of the upper component 112, and the rails 168 of the lower component 114 maintain positioning of the first side component 116, the second side component 118, the upper component 112, and the lower component 114 with respect to each other in the housing.

Figure 14:
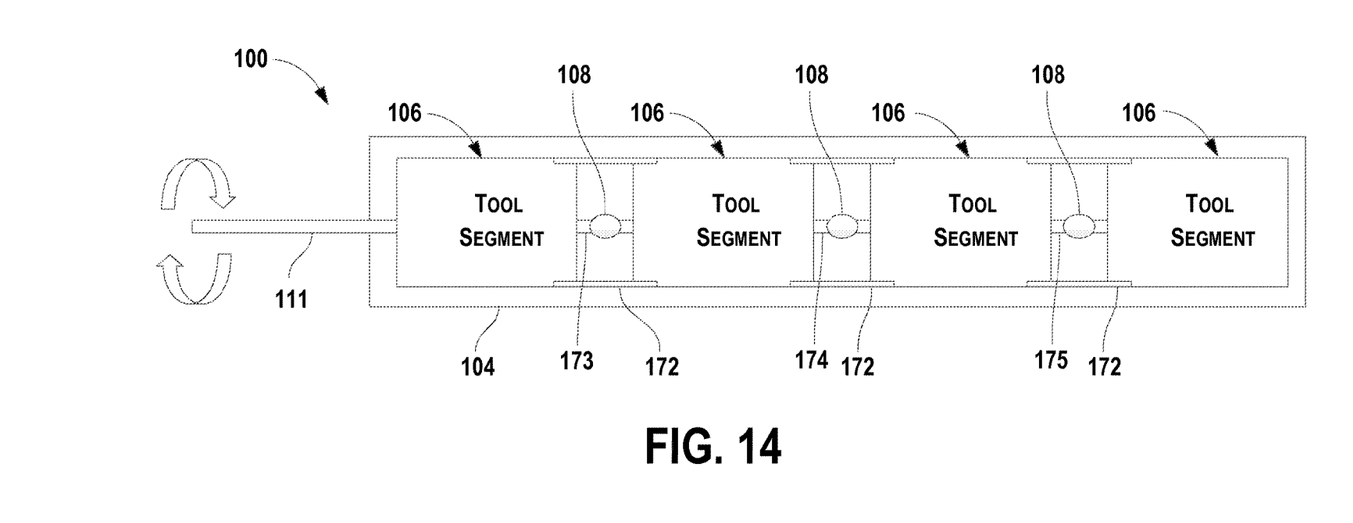
FIG. 14 illustrates an example of the mandrel including a plurality of tool segments connected to each other within the housing, according to an example embodiment.

FIG. 14 illustrates an example of the mandrel 100 including a plurality of tool segments 106 connected to each other within the housing 100, according to an example embodiment. In this example configuration, each tool segment 106 includes the plurality of components positioned to create a central opening within the tool segment and at least one expander positioned in the central opening of the tool segment (as described with reference to FIGS. 3-6). The mandrel 100 includes the actuator 111 that moves respective expanders into respective central openings of the plurality of tool segments 106 causing respective plurality of components to expand the housing 104 and to retract the respective expanders from the respective central openings causing the respective plurality of components to collapse the housing 104. The mandrel 100 also includes a plurality of the joint linkages 108 coupling or connecting the plurality of tool segments 106 in a sequential manner. The actuator 111 is positioned through a respective tool segment 106 and is coupled to a respective joint linkage 108, and the plurality of joint linkages 108 allow for movement of the plurality of tool segments 106 with respect to each other.

Thus, in the example configuration shown in FIG. 14, each tool segment 106 includes a plurality of components and an expander and a central opening, and the actuator 111 functions to operate all of the tool segments 106 simultaneously. The housing 104 may be an elastic bladder section that is flexible, and the joint linkages 108 allow for flexibility of the mandrel 100 so that the mandrel 100 can fit to a contour inside a stringer and also maintain rigidity. In some examples, some of the tool segments 106 may have different cross-sections to allow the mandrel 100 to accommodate variations in part cross-sections along a length of the part.

The joint linkages 108 provide separation between the tool segments 106, and allow for movement among the tool segments 106. The actuator 111 is positioned through a respective tool segment 106 and attaches to a respective joint linkage 108. In this way, the actuator 111 may comprise multiple rod components such as rods 173, 174, and 175, etc. The joint linkages 108 connect each component of the rod 111.

The joint linkages 108 couple to a substantially center region of the tool segments 106, and multiple connected plates 172 are provided to enclose respective gaps between adjacent tool segments 106. The multiple connected plates 172 slide over each other to allow for movement of the tool segments 106 with respect to each other.

Figure 15:
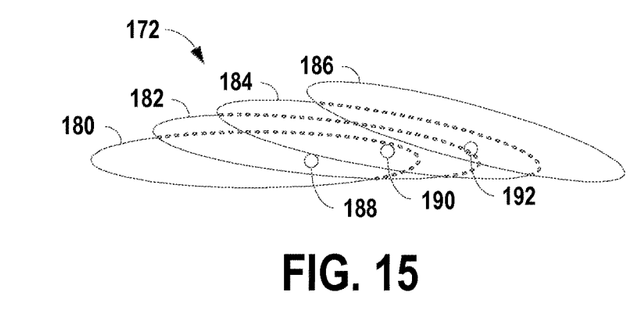
FIG. 15 illustrates an example of the multiple connected plates, according to an example embodiment.

FIG. 15 illustrates an example of the multiple connected plates 172, according to an example embodiment. The multiple connected plates include plates 180, 182, 184, and 186. The plate 180 is connected at pivot point 188 to the plate 182. The plate 182 is connected at pivot point 190 to the plate 184. The plate 184 is connected at pivot point 192 to the plate 186. The multiple connected plates 172 act like an elbow joint and allow the plates 180, 182, 184, and 186 to slide over each other to allow for movement while enclosing gaps between the tool segments 106. The plates 180, 182, 184, and 186 may be metal plates, plastics plates, rubber plates, etc., that allow for movement.

The mandrel 100 shown in FIG. 14 can be configured to have any number of tool segments 106 as needed for a particular use. As one example, for a repair of a composite part, a total length of the mandrel may be between about 6-12 inches long, and each tool segment 106 may be a few inches (e.g., 3-5 inch pieces). The length of the mandrel 100 can be extended by screwing on another tool segment 106 at an end joint linkage.

Figure 16:
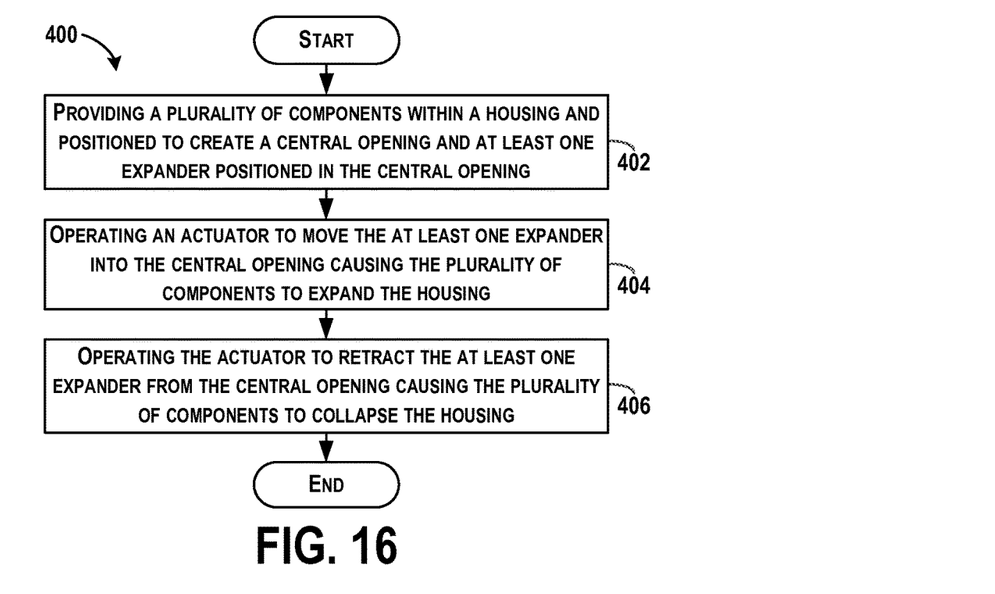
FIG. 16 shows a flowchart of an example method for operating the mandrel, according to an example embodiment.

FIG. 16 shows a flowchart of an example method 400 for operating the mandrel 100, according to an example embodiment. Method 400 shown in FIG. 16 presents an embodiment of a method that, for example, could be used for the mandrel shown in FIG. 1, for example. In some examples, components of the mandrel 100 may be arranged to be adapted to, capable of, or suited for performing the functions, such as when operated in a specific manner. Method 400 may include one or more operations, functions, or actions as illustrated by one or more of blocks 402-406. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present embodiments. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

At block 402, the method 400 includes providing a plurality of components within a housing and positioned to create a central opening and at least one expander positioned in the central opening. At block 404, the method 400 includes operating an actuator to move the at least one expander into the central opening causing the plurality of components to expand the housing. This enables the housing to be expanded and have a stiff surface for better support within an internal cavity of a composite part being cured. At block 406, the method 400 includes operating the actuator to retract the at least one expander from the central opening causing the plurality of components to collapse the housing. This enables the housing to be removed from the internal cavity more easily due to a reduction in size.

Figure 17:
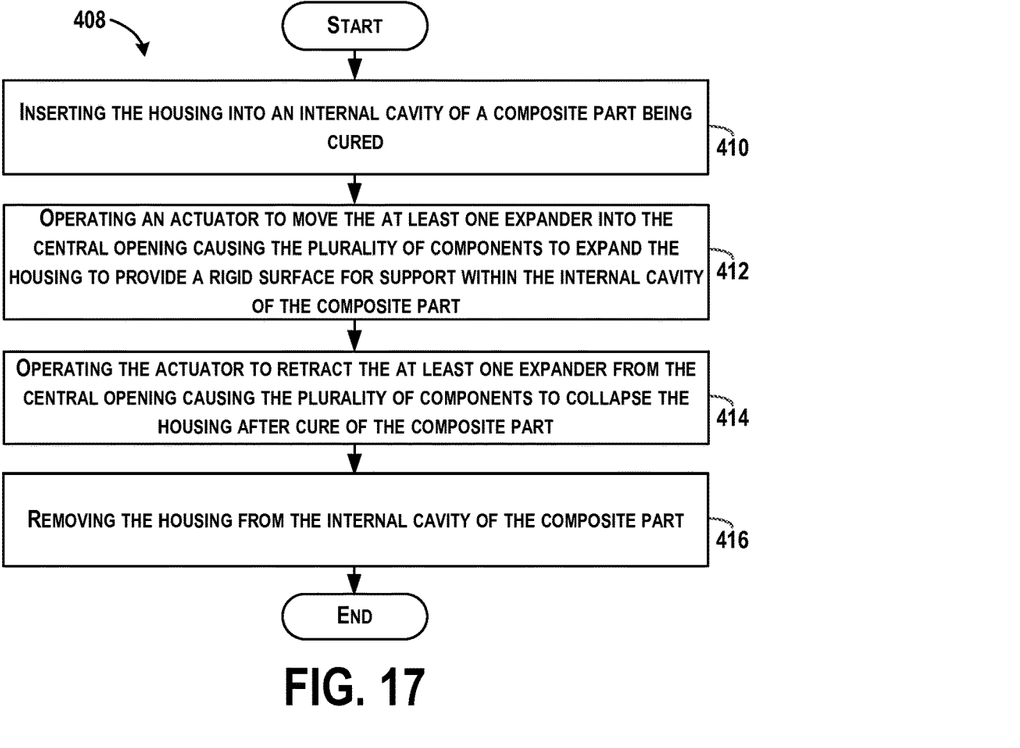
FIG. 17 shows a flowchart of another example method for operating the mandrel, according to an example embodiment.

FIG. 17 shows a flowchart of another example method 408 for operating the mandrel 100, according to an example embodiment. At block 410, the method 408 includes inserting the housing into an internal cavity of a composite part to be cured. At block 412, the method 408 includes operating the actuator to move the at least one expander into the central opening causing the plurality of components to expand the housing to provide a rigid surface for support within the internal cavity of the composite part. At block 414, the method 408 includes operating the actuator to retract the at least one expander from the central opening causing the plurality of components to collapse the housing after cure of the composite part. At block 416, the method 408 includes removing the housing from the internal cavity of the composite part.

Figure 18:
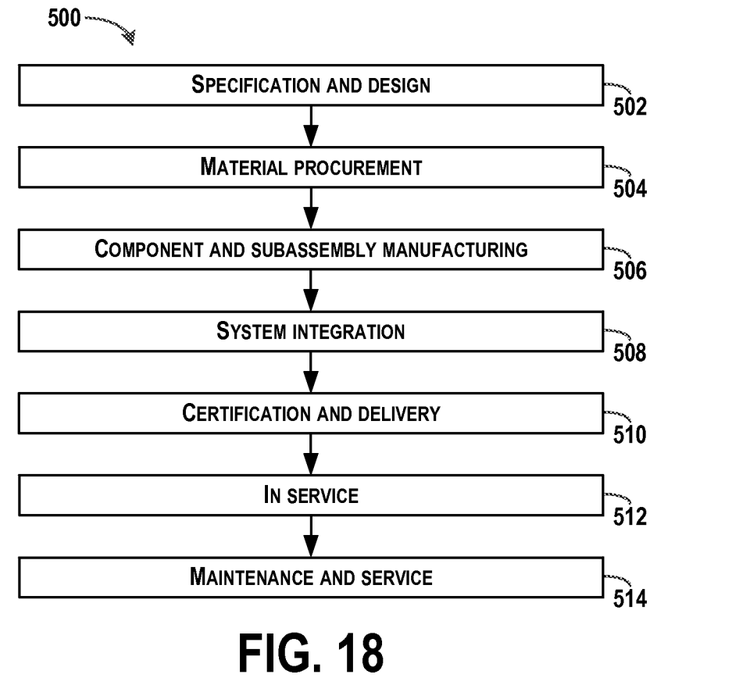
FIG. 18 shows a flowchart of an example aircraft manufacturing and service method, according to an example embodiment.
Figure 19:
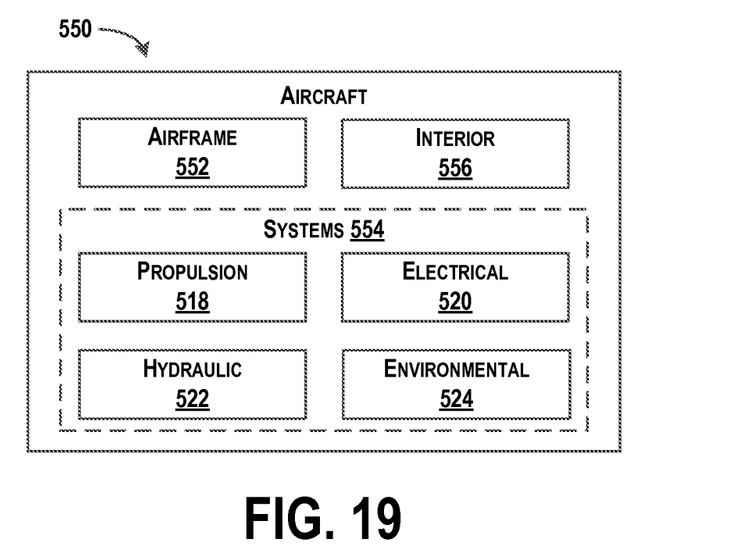
FIG. 19 shows a block diagram of an aircraft, according to an example embodiment.

Within examples, the mandrel 100 can be used during manufacture of composite parts, or during repair of composite parts. Embodiments of the disclosure may find use in a variety of potential applications, particularly in the transportation industry, including for example, aerospace, marine, automotive applications and other application where autoclave curing of composite parts may be used. Therefore, referring now to FIGS. 18 and 19, embodiments of the disclosure may be used in the context of an aircraft manufacturing and service method 500 as shown in FIG. 18 and an aircraft 550 as shown in FIG. 19. Aircraft applications of the disclosed embodiments may include, for example, without limitation, curing of stiffener members such as, without limitation beams, spars and stringers, to name only a few. During pre-production, exemplary method 500 may include specification and design 502 of the aircraft 550 and material procurement 504. During production, component and subassembly manufacturing 506 and system integration 508 of the aircraft 550 takes place. Thereafter, the aircraft 550 may go through certification and delivery 510 in order to be placed in service 512. While in service by a customer, the aircraft 550 is scheduled for routine maintenance and service 514, which may also include modification, reconfiguration, refurbishment, and so on.

Each of the processes of method 500 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 19, the aircraft 550 produced by exemplary method 500 may include an airframe 552 with a plurality of systems 554 and an interior 556. Examples of high-level systems 554 include one or more of a propulsion system 518, an electrical system 520, a hydraulic system 522, and an environmental system 524. Any number of other systems may be included. Although an aerospace example is shown, the principles of the disclosure may be applied to other industries, such as the marine and automotive industries.

Systems and methods embodied herein may be employed during any one or more of the stages of the production and service method 500. For example, components or subassemblies corresponding to production process 502 may be fabricated or manufactured in a manner similar to components or subassemblies produced while the aircraft 550 is in service. Also, one or more apparatus embodiments, method embodiments, or a combination thereof may be utilized during the production stages 502 and 504, for example, by substantially expediting assembly of or reducing the cost of an aircraft 550. Similarly, one or more of apparatus embodiments, method embodiments, or a combination thereof may be utilized while the aircraft 500 is in service, for example and without limitation, to maintenance and service 510.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to explain the principles of the embodiments, the practical application, and to enable others of ordinary skill in the art to understand the disclosure for various embodiments with various modifications as are suited to the particular use contemplated.

What is claimed is:

1. A mandrel comprising:
    a housing;
    a plurality of tool segments within the housing, and each tool segment comprising
        (i) a plurality of components positioned to create a central opening within the tool segment, and (ii) at least one expander positioned in the central opening of the tool segment,
    wherein the at least one expander has a width that increases along a length of the at least one expander, and a narrow end of the at least one expander is positioned in the central opening;
    a plurality of joint linkages coupling the plurality of tool segments in a sequential manner, wherein the plurality of joint linkages allow for movement of the plurality of tool segments with respect to each other; and
    an actuator positioned through the plurality of tool segments and coupled to the plurality of joint linkages, wherein the actuator moves respective expanders into respective central openings of the plurality of tool segments causing respective plurality of components to expand the housing and to retract the respective expanders from the respective central openings causing the respective plurality of components to collapse the housing.

2. The mandrel of claim 1, wherein the actuator moves the narrow end of the respective expanders into the respective central openings so that wider portions of the respective expanders contact the respective plurality of components and push the respective plurality of components outward to expand the housing.

3. The mandrel of claim 1, wherein the actuator moves the respective expanders into the respective central openings causing the respective plurality of components to separate from each other, resulting in expansion of the housing.

4. The mandrel of claim 1, wherein the actuator retracts the respective expanders from the respective central openings causing the respective plurality of components to reduce a size of the respective central openings, resulting in a reduction in size of the housing.

5. The mandrel of claim 1, wherein the actuator comprises a threaded member positioned within the respective expanders, wherein the threaded member is rotatable to move the respective expanders into the respective central openings causing the respective plurality of components to slide outward and expand the housing.

6. The mandrel of claim 1, wherein the actuator comprises a threaded member positioned within the respective expanders, wherein the threaded member is rotatable to pull the respective expanders into the respective central openings toward a center of the mandrel.

7. The mandrel of claim 1, wherein the plurality of joint linkages couple to a substantially center region of the plurality of tool segments, and the mandrel further comprises:
    multiple connected plates enclosing respective gaps between adjacent tool segments of the plurality of tool segments, wherein the multiple connected plates slide over each other to allow for movement of the plurality of tool segments with respect to each other.

8. A mandrel comprising:
    a housing;
    a plurality of tool segments within the housing, and each tool segment comprising
        (i) an upper component, a lower component, a first side component, and a second side component each within the housing and positioned to create a central opening, and (ii) at least one expander having a width that increases along a length of the at least one expander, and the at least one expander positioned in the central opening;
    a plurality of joint linkages coupling the plurality of tool segments in a sequential manner, wherein the plurality of joint linkages allow for movement of the plurality of tool segments with respect to each other; and
    a threaded member positioned through the plurality of tool segments and coupled to the plurality of joint linkages, wherein the threaded member is rotatable to move respective expanders into respective central openings of the plurality of tool segments causing respective upper components, lower components, first side components, and second side components to to slide outward and expand the housing.

9. The mandrel of claim 8, wherein the respective upper components, lower components, first side components, and second side components are positioned within the housing in a first unexpanded state, and rotation of the threaded member causes the respective upper components, lower components, first side components, and second side components to be positioned in a second expanded state.

10. The mandrel of claim 8, wherein the respective first side components and second side components have a top surface that abuts a bottom surface of the respective upper components, and a bottom surface that abuts a top surface of the respective lower components.

11. The mandrel of claim 10, wherein rotation of the threaded member causes the top surface of the respective first side components and second side components to push the bottom surface of the respective upper components upward as the respective first side components and second side components slide outward causing the respective upper components, first side components, and second side components to separate.

12. The mandrel of claim 8, wherein the respective first side components and second side components include internal side channels, and the respective expanders includes side rails to slide into the internal side channels of the respective first side components and second side components.

13. The mandrel of claim 8, wherein the respective first side components and second side components include external channels, and the respective upper components includes rails to slide into the external channels of the respective first side components and second side components.

14. The mandrel of claim 8, wherein the respective first side components and second side components include internal side channels, external upper channels, and external lower channels, wherein the respective expanders includes side rails to slide into the internal side channels of the respective first side components and second side components;

wherein the respective upper components includes rails to slide into the external upper channels of the respective first side components and second side components; and wherein the respective lower components includes rails to slide into the external lower channels of the respective first side components and second side components, wherein the internal side channels, the external upper channels, and the external lower channels of the respective first side components and second side components, as well as the side rails of the respective expanders, the rails of the respective upper components, and the rails of the respective lower components maintain positioning of the respective first side components, second side components, upper components, and lower components with respect to each other in the housing.

15. The mandrel of claim 8, wherein the housing has a first end and a second end, and wherein the respective central openings are at the first end and respective second central openings are at the second end, and the plurality of tool segments further comprise:

respective second expanders having a width that increases along a length of the respective second expanders, and the respective second expanders are positioned in the respective second central openings, wherein the threaded member is positioned within the respective second expanders.

16. The mandrel of claim 15, wherein the threaded member is rotatable to move the respective expanders into the respective central openings and the respective second expanders into the respective second central openings causing expansion of the housing.

17. The mandrel of claim 15, wherein the respective expanders are right hand threaded and the respective second expanders are left hand threaded so that the threaded member is rotatable to move the respective expanders are into the respective central openings and the respective second expanders into the respective second central openings causing the respective expanders and the respective second expanders to move toward each other.

* * * * *